United States Patent [19]
Buchelt

[11] Patent Number: 6,007,297
[45] Date of Patent: Dec. 28, 1999

[54] BLADE FOR KAPLAN TURBINE

[75] Inventor: Benno Buchelt, Maria/Saal, Austria

[73] Assignee: EFG—Turbinen- Und Kraftwerksanlagenbau EFG-Energieforschungs- Und Entwicklungs- GmbH & Co. KG, Feldkirchen, Austria

[21] Appl. No.: 08/865,239

[22] Filed: May 29, 1997

[51] Int. Cl.$^6$ ........................................... F03B 3/18
[52] U.S. Cl. ...................... 415/161; 415/163; 415/164; 415/148
[58] Field of Search ........................... 415/163, 162, 415/161, 160, 164, 159, 148

[56] References Cited

U.S. PATENT DOCUMENTS

| | | | |
|---|---|---|---|
| 1,197,761 | 8/1916 | Pfau | 415/164 |
| 1,688,736 | 10/1928 | Moody | 415/163 |
| 1,728,435 | 9/1929 | Moody | 415/161 |
| 1,750,400 | 3/1930 | Gibbs et al. | 415/163 |
| 3,332,441 | 7/1967 | Schaale | 415/163 |
| 3,377,051 | 4/1968 | Lecher | 415/163 |
| 5,441,384 | 8/1995 | Gokhman | 415/161 |

*Primary Examiner*—F. Daniel Lopez
*Assistant Examiner*—Richard Woo
*Attorney, Agent, or Firm*—Herbert Dubno

[57] ABSTRACT

A blade for a Kaplan turbine has substantially linear touching lines for contacting, in the closed position of the guide blade array, adjacent guide blades, the contact lines being linear or curved and running generally parallel to the pivot axis of the blade. The trailing side of the blade extends progressively inwardly and with a progressively increasing distance from the touching line on the trailing side.

5 Claims, 10 Drawing Sheets

BLADE FOR KAPLAN TURBINE

FIELD OF THE INVENTION

My present invention relates to a Kaplan turbine having a radial inlet flow of rotational symmetry approximately directed perpendicularly to the turbine axis $D_T$ and where the axes $D_L$ of the inlet guide vanes are parallel to the turbine axis $D_T$. At an outer radial distance from the inlet guide vanes LE there might be a scroll casing or a free inlet chamber.

A typical turbine of that type can have a vertical axis which might replace an old Francis turbine in an old existing concrete building. In that case no inlet scroll is provided and downstream of the turbine there might be a curved suction pipe.

BACKGROUND OF THE INVENTION

A basic requirement of flow regulation in a Kaplan turbine is to be able to close the inlet guide vanes LE by means of turning them around the axis $D_L$.

Until now it was believed that this requirement could only be ensured by means of guide vanes of cylindrical shape, because only then would one have touching lines of overlapping guide vanes in the form of cylinder-generating straight lines E1 and E2 which are a part of the profile of the cylinder.

On the other hand a design of vanes and blades according to the potential flow theory is most promising for best efficiency because $\operatorname{rot} \vec{c} = 0$ cannot be achieved by means of cylindrical guide vanes.

The cylindrical guide vane requires a constant distribution of the meridian velocity component along axis $D_L$ and projected perpendicular to the axis $D_L$, which constant distribution is not possible due to the strongly curved 90° deflection of the stream shroud contour, which deflects the stream lines.

For the accelerating flow in turbine vane cascades the application of a stream line picture based on the potential flow theory is a good approximation of the real flow if one considers the strongly varying meridian velocity component not only along the leading edge and trailing edge of the runner vanes but also along leading and trailing edges of the inlet guide vanes.

A design based upon a potential vortex motion ($\operatorname{rot} \vec{c} = 0$) promises best efficiency and causes a constant value of angular momentum $r^*C_u$=const. in the space between runner vanes and guide vanes.

On the other hand, the guide vanes should also be able to close the flow. Published designs with axis $D_L$ parallel to $D_T$ do not have twisted guide vanes.

Since the invention of Kaplan turbines, those with a vertical axis and radial inflow have been made with cylindrical guide vanes.

Because Kaplan turbines with cylindrical guide vanes might reach high overall efficiencies (up to 94%) the cylindrical guide vanes in general were accepted

OBJECTS OF THE INVENTION

The objective of the invention is not primarily to improve the already high level of efficiencies of Kaplan turbines with radial inflow and cylindrical guide vanes at design point conditions; rather, the objective is to improve the partial load efficiency and to expand the regulation limits of the flow passing the turbine.

It is, however, also an object to improve the efficiency of a Kaplan turbine at design point conditions.

SUMMARY OF THE INVENTION

These objects and others which will become apparent hereinafter are attained, in accordance with the invention, in a Kaplan guide vane in which the vane is at least partially twisted over at least one-third of the axial length so that the twisted portion as defined by section planes perpendicular to the vane axis do not end at the downstream touching line of that vane with other vanes of the circular array, but are turned inwardly where they increasingly overlap the adjacent vane. The vane thus has a profile which causes a change of the exiting flow from a more tangential direction where the trailing edge is located close to the downstream touching line to a substantially more radial direction of flow where the leading edge terminates more distally from the downstream touching line.

BRIEF DESCRIPTION OF THE DRAWING

The above and other objects, features, and advantages will become more readily apparent from the following description, reference being made to the accompanying drawing in which:

FIG. 9 is a view of the guide vane in the direction of arrow X2 of FIG. 10 while

SPECIFIC DESCRIPTION

Figure 7:
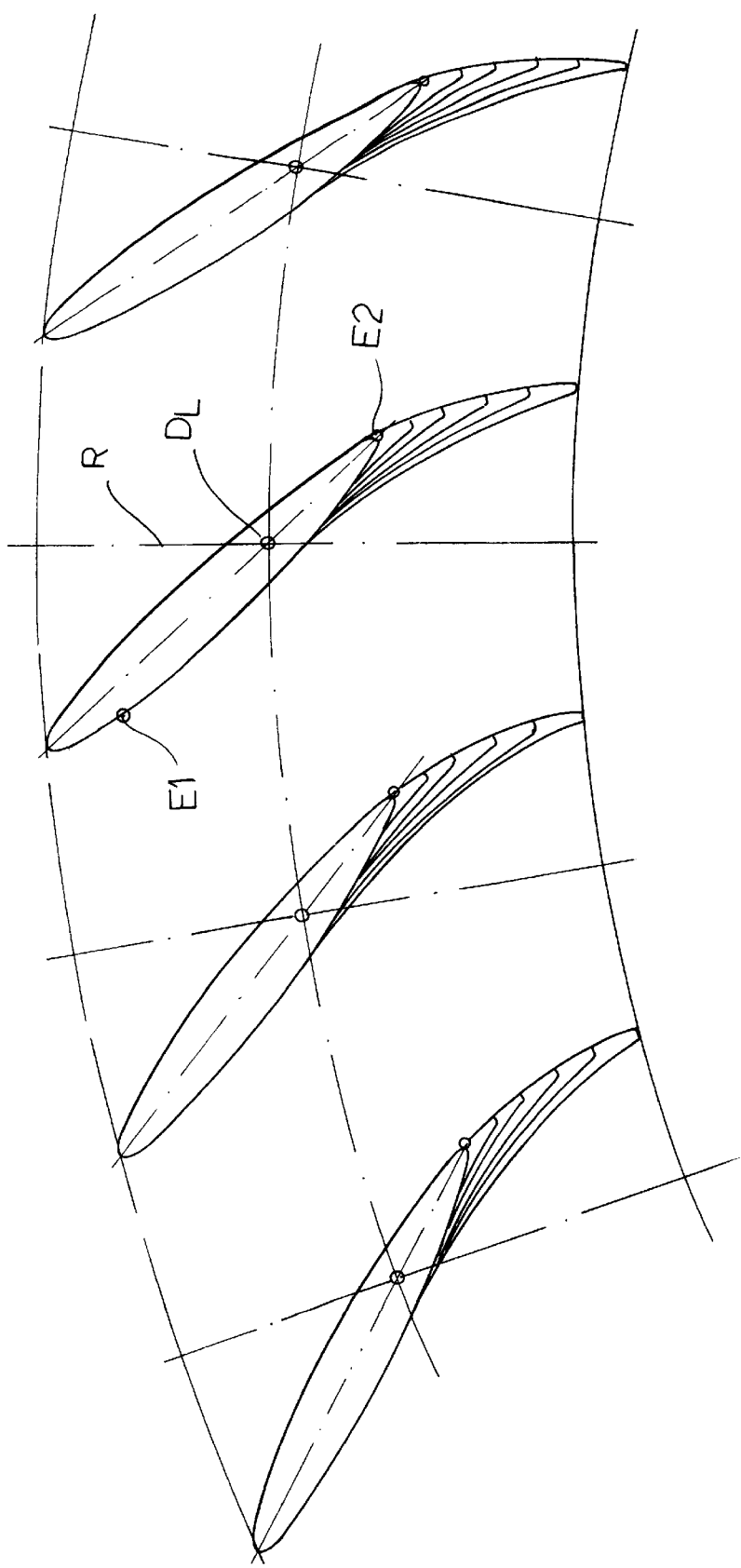
FIG. 7 is a diagram similar to FIG. 4 showing part of an array of guide vanes.
Figure 8:
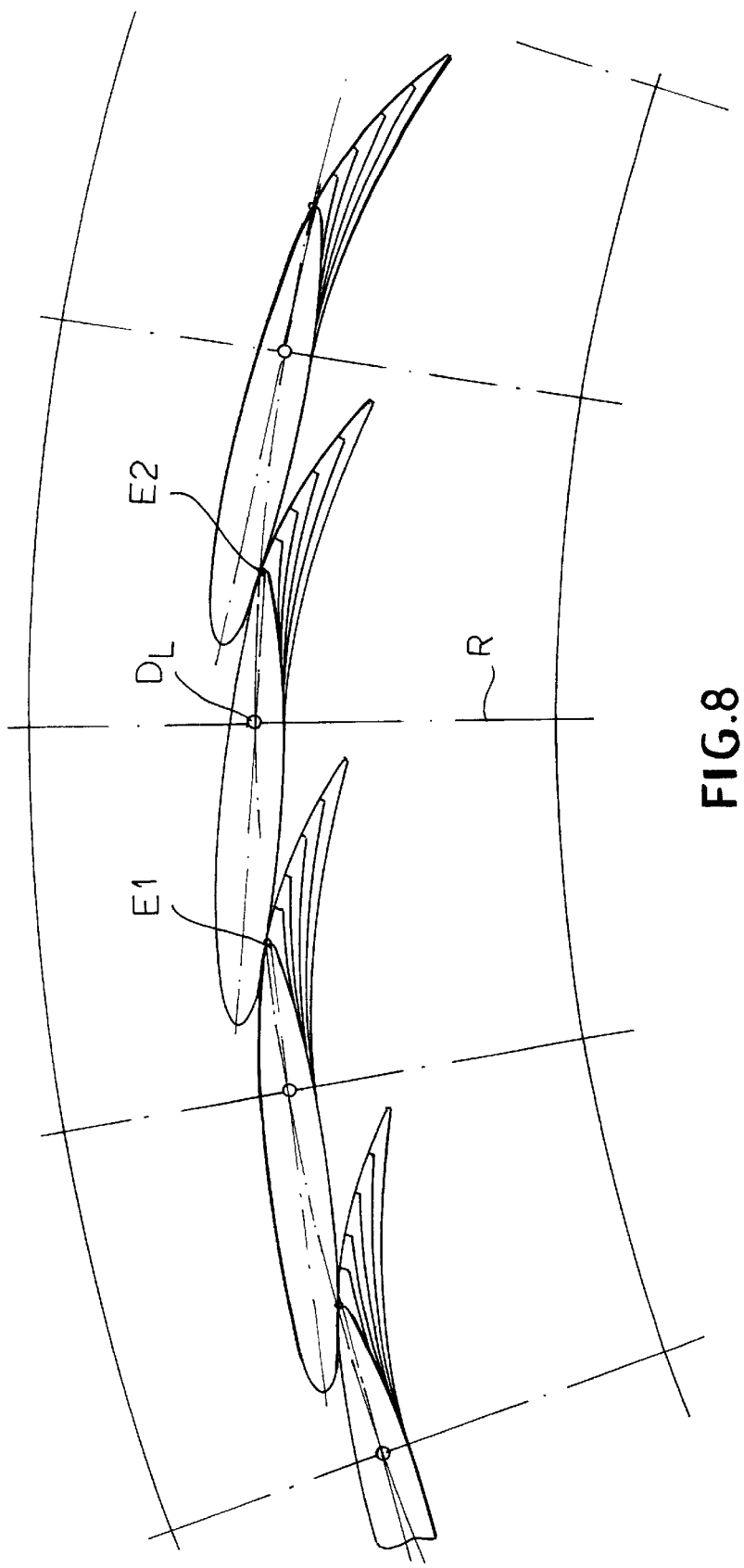
FIG. 8 is a diagram similar to FIG. 7 showing the guide vanes in their closed position.
Figure 9:
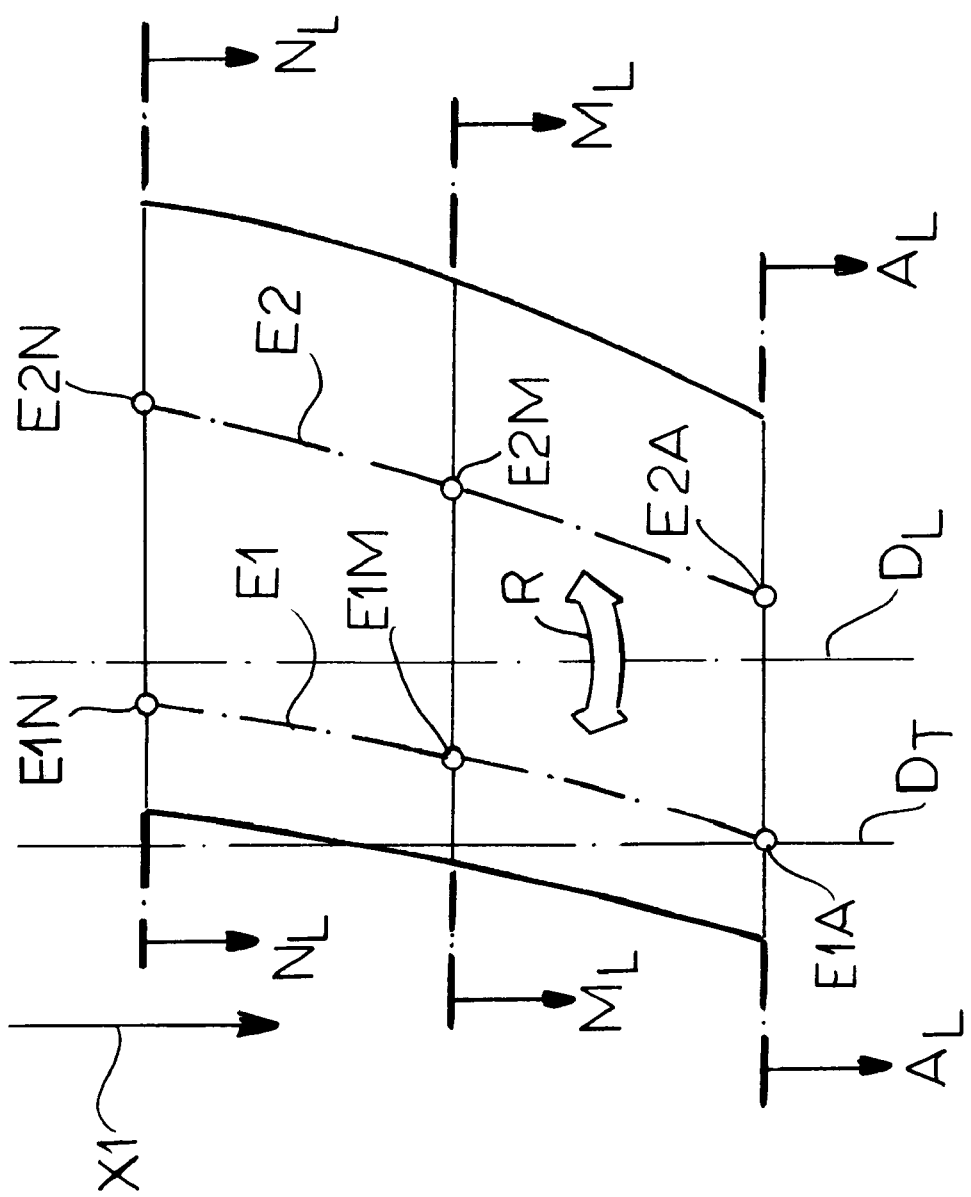
Figure 10:
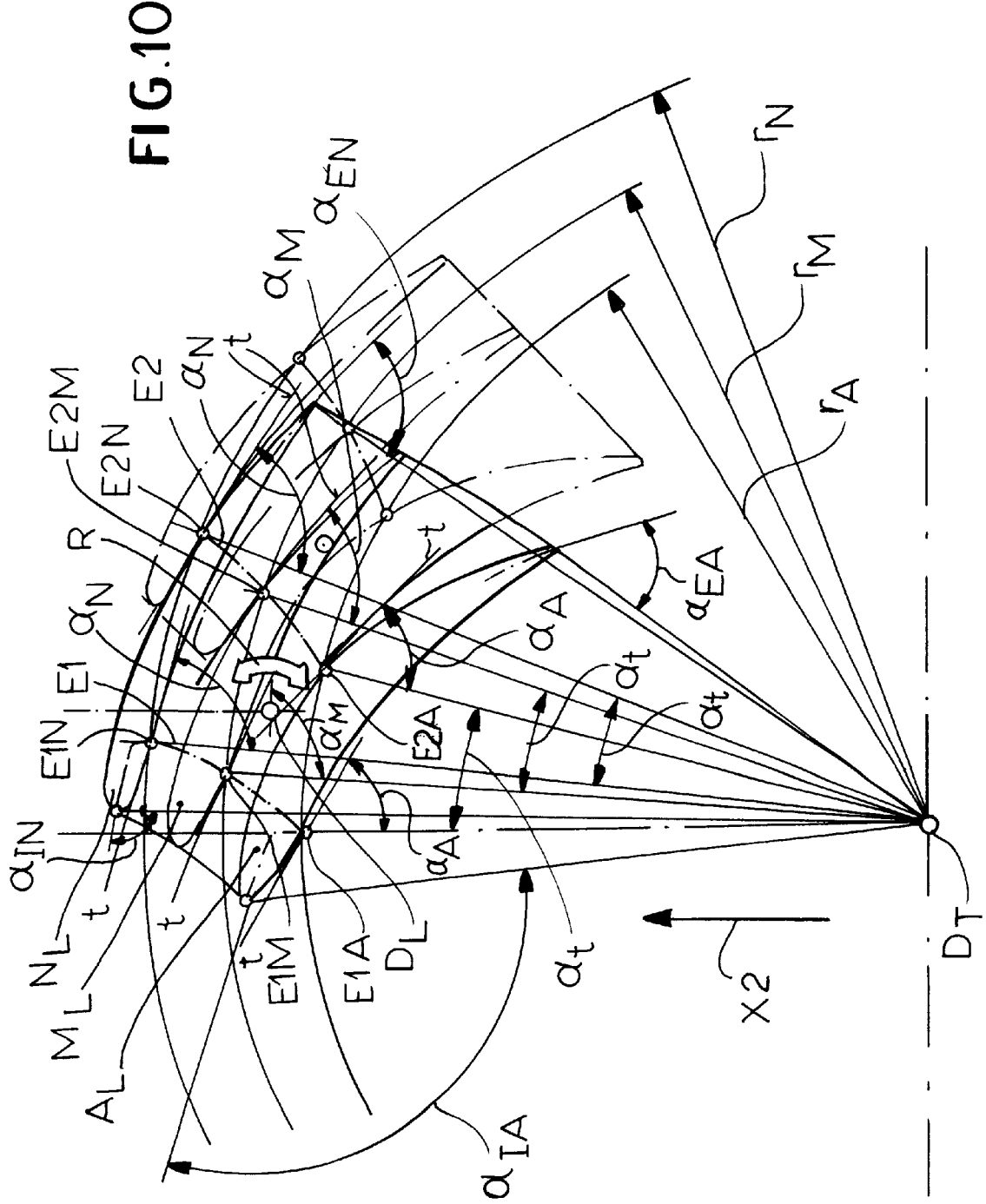
FIG. 10 is a plan view in the direction of arrow X1 of FIG. 9.

FIGS. 1 and 3 through 8 describe parts with computed shape proportions of a realistic Kaplan turbine design according to the invention, whereas FIG. 9 and FIG. 10 are abstract-principle FIGURES showing a twisted inlet vane design performing the closing requirement without compromise.

Figure 2:
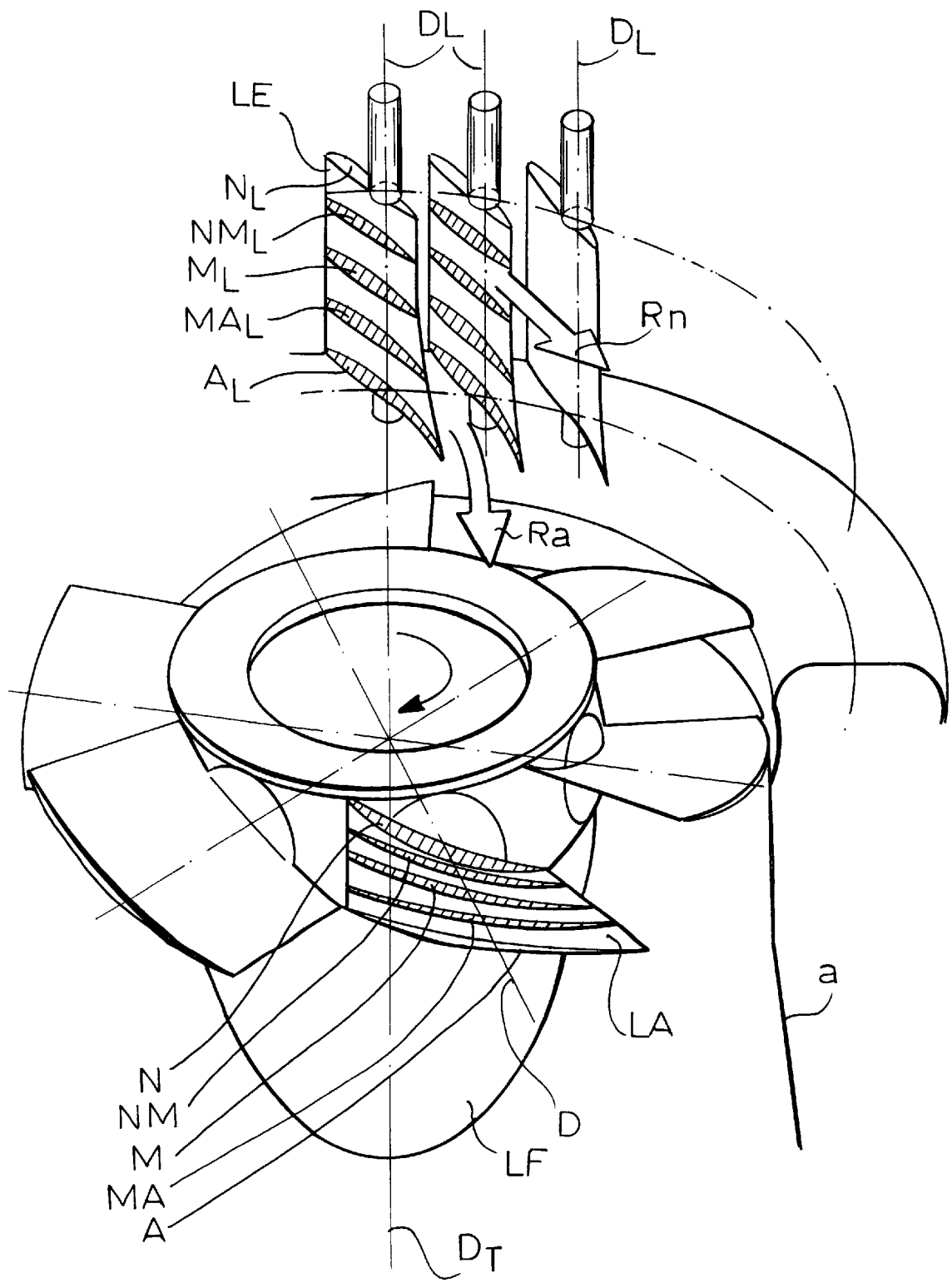
FIG. 2 is a diagrammatic perspective view showing the profiles of the guide vanes and the runner vanes.
Figure 3:
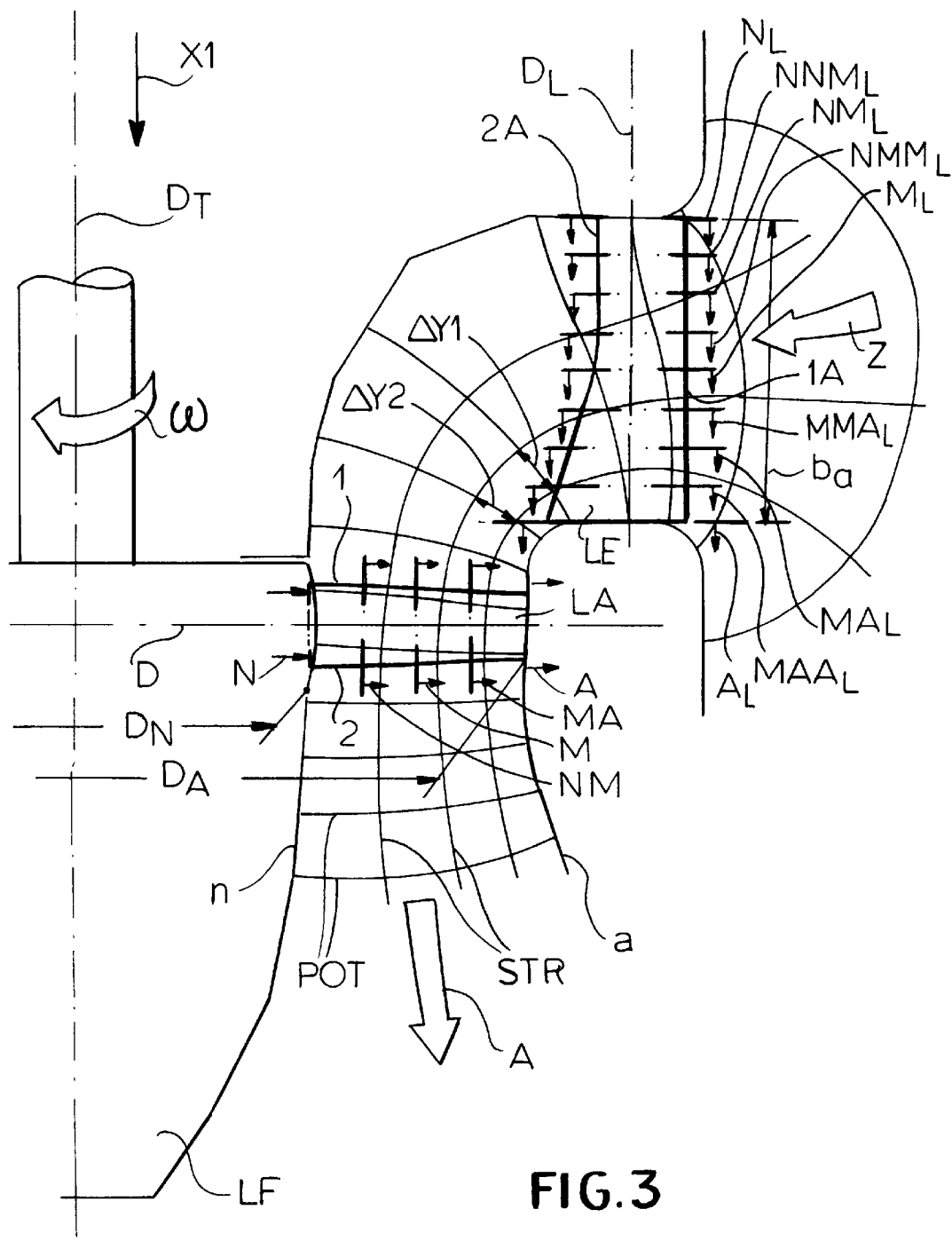
FIG. 3 is a diagram illustrating the flow characteristics between the guide vanes and the runner vanes and illustrating the section lines for various profiles.
Figure 4:
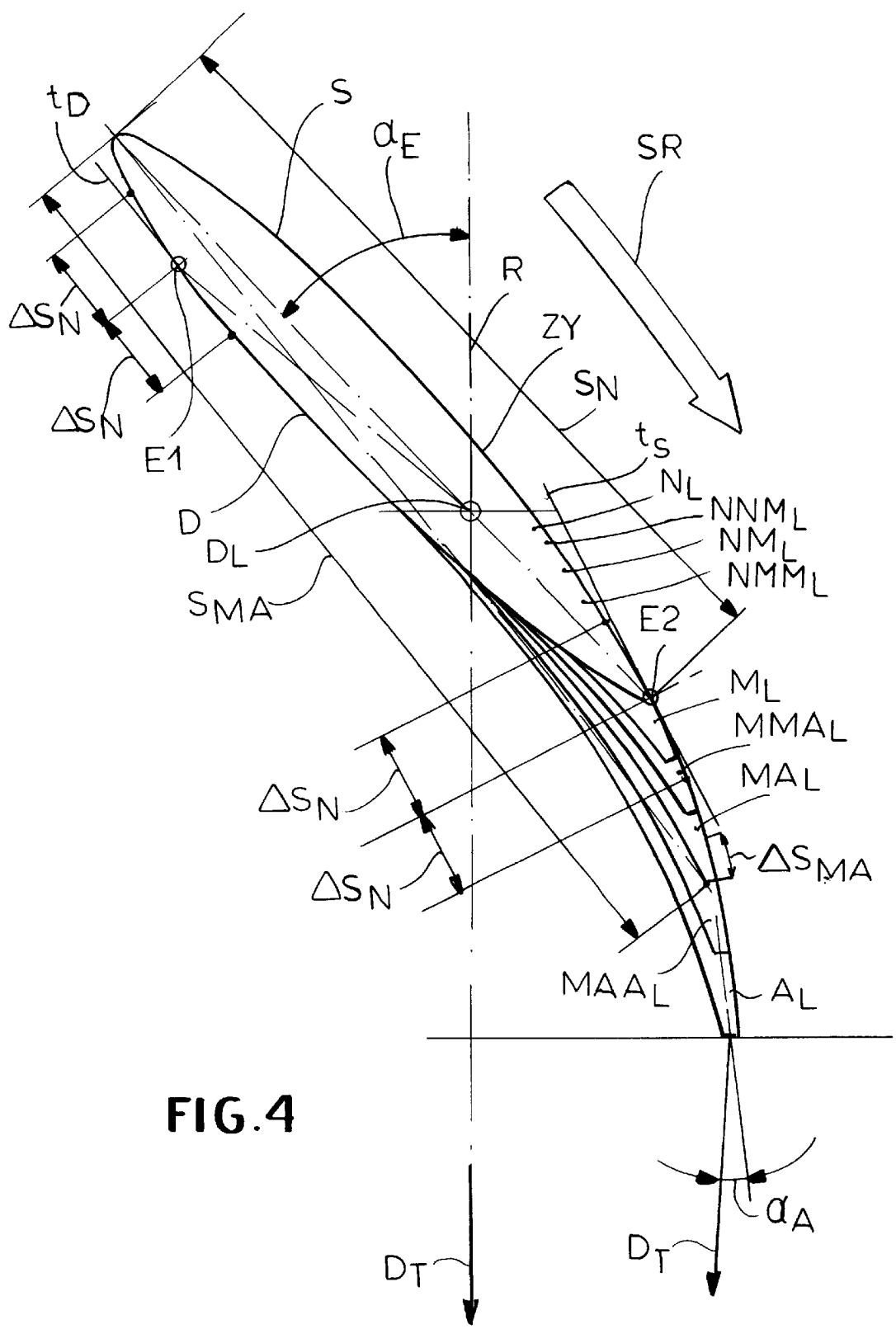
FIG. 4 is a plan view of one of the guide vanes diagrammatically showing successive sections in supposition.

The touching lines E1 and E2 are curved lines in space, whereas in FIGS. 1 through 8 the lines E1 and E2 are straight lines parallel to the guide vane axis $D_L$ and therefore also parallel to the turbine axis $D_T$ The guide vane profiles of FIG. 4 represent a simplified compromise between the closing requirement and the requirement for twisted vanes as necessary for creating the boundary conditions for a potential flow design. This compromise is favorable for the, manufacturing process and has a deviation from the theoretically calculated exit angles of the twisted vane of only ± (1.5%, whereas the inlet angles at the radially outermost leading edges deviate plus) minus 5% which is permissible in a place where the absolute values of velocities are low and where one can permit larger deviations from the aimed potential flow.

Figure 6:
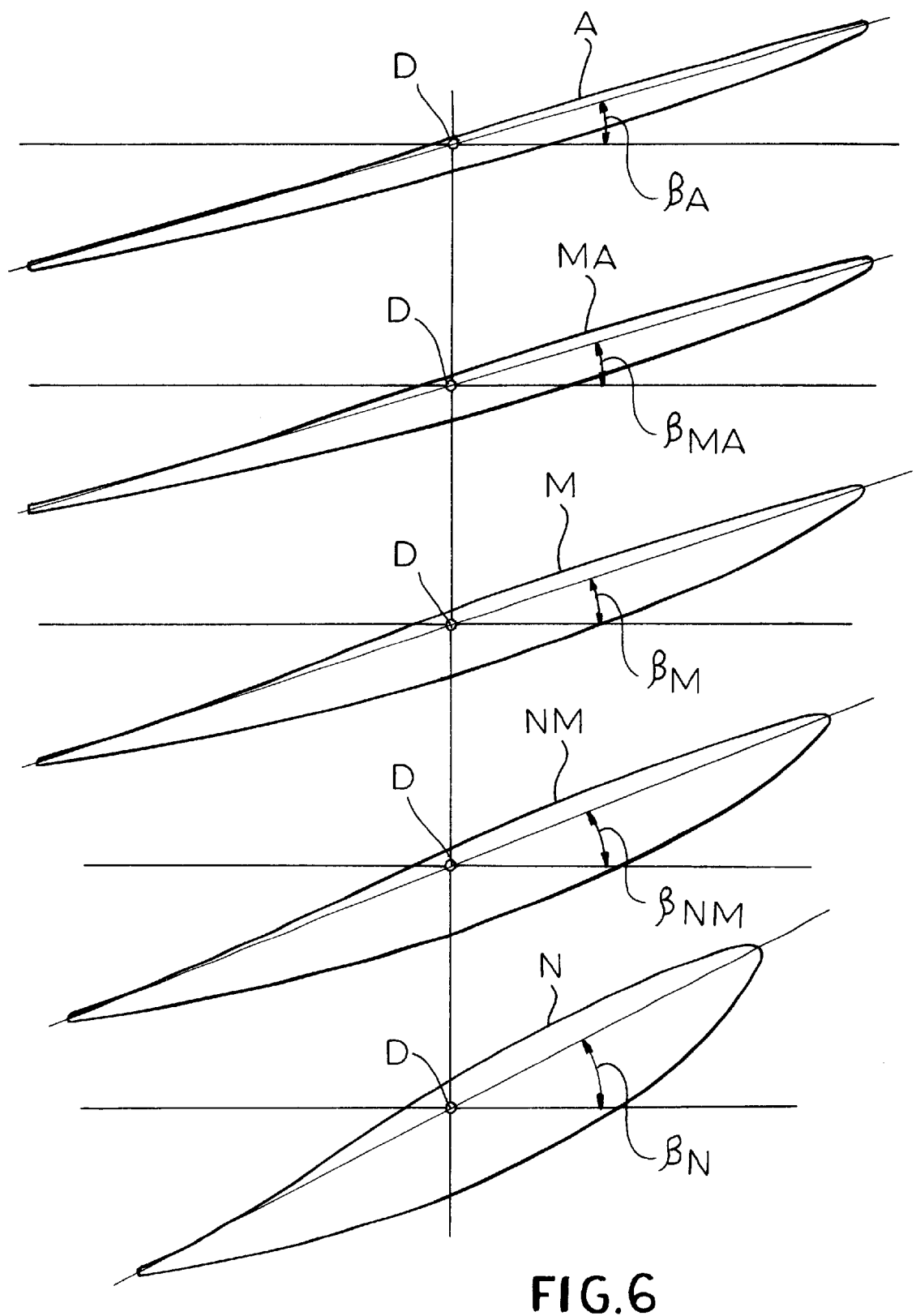
FIG. 6 is a diagram in which successive sections of a runner vane have been shown positioned above one another so that the runner vane contour will be more readily recognized.

The essential advantage of such an approximation of a correctly twisted inlet guide vane according to the potential flow theory is a lesser twist of the runner vanes, compared with turbines with cylindrical guide vanes and hence a better part load efficiency and an expanded range of flow regulation as will be explained below. FIG. 2 and FIG. 6 illustrate the small twist of the runner vanes as a typical feature to the invention.

Figure 1:
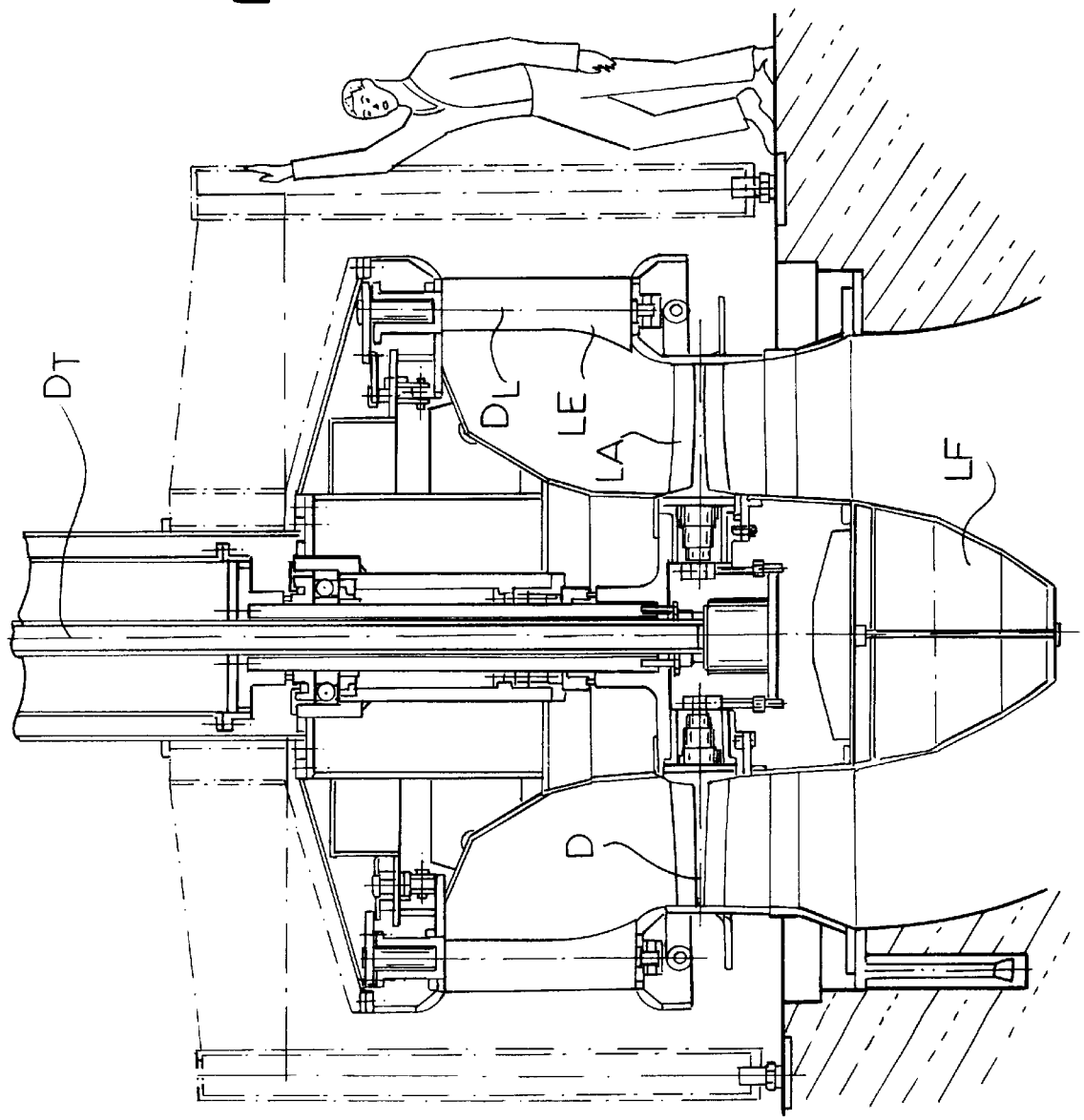
FIG. 1 is a diagrammatic axial section through a Kaplan-turbine provided with guide vanes and runner vanes according to the invention.

The realistic design according to FIG. 1 and FIG. 3 for example has only 10 degrees difference of the profile pitch angle β between the hub profile cylinder section N and the radial outermost cylinder section profile A (see FIG. 6).

An advantage is the ease of computing flow along the whole flowpath which ranges from an angular momentum equal zero at the downstream runner exit to $$\Delta c_u = \frac{h_u}{u}$$

at the entrance of the runner vanes, where $h_u$ has the dimension J kg of the specific energy per kg flow passing the turbine, and $\Delta c_u$ is the difference of projections of absolute velocities to the peripheral direction, that means $\Delta c_u = (c_{1u} - c_{2u})$ with $c_{2u}=0$ when the angular momentum is equal to zero in the runner exit.

Because of the approximate presence of potential flow due to the twisted guide vane of the invention, there is a constant angular momentum in the space between the guide vanes and the runner vanes, that means $\Delta c_u * r = const$. The effective values of $\Delta c_u$ along the trailing edge of the guide vanes are there added as a vector under a 90° angle to the vector of the meridian velocity component, extracted from the potential network of FIG. 3, thus forming the tangent for the value of the typical exit angle $\alpha_A$ as marked in FIG. 4.

Figure 5:
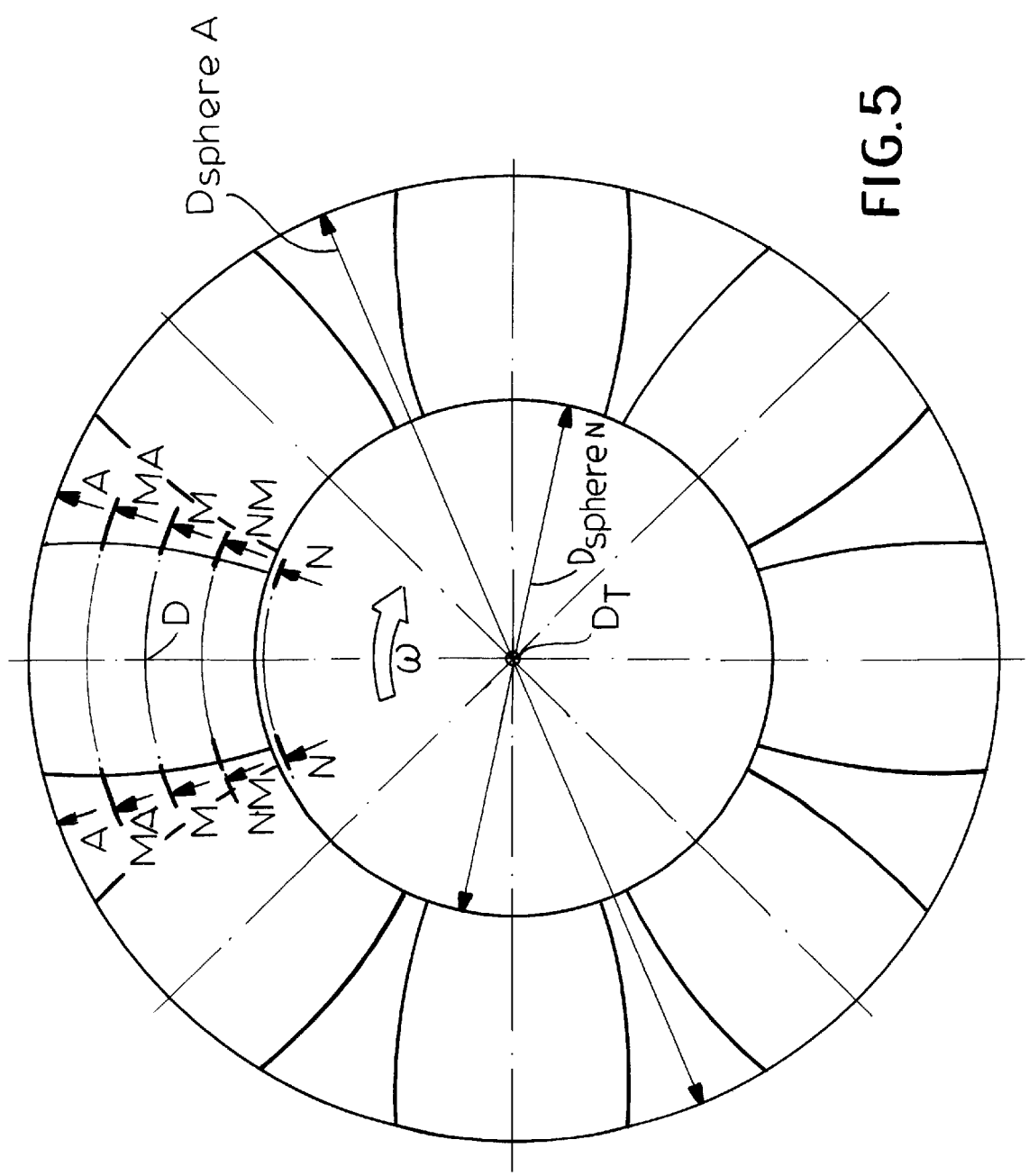
FIG. 5 is a plan view diagrammatically illustrating the runner vane array, FIG. 5 being a view in the direction of the arrow XI of FIG. 3.

A further advantage of the small twist of the runner vane as a consequence of the twisted guide vane in combination with a greater number of runner blades, for example 8 and in a combination with no overlap in an axial view like FIG. 5, is the possibility of reversing the flow direction in the sense of changing turbine operation with smooth transition into pumping operation, while keeping speed and direction of rotation by applying a negative pitch angle to the adjustable runner blades. This procedure could free the turbine from contamination, for example plugging leaves, which can greatly disturb turbine operation.

The usual chaos-regulation for the shaking off leaves, applied on turbines of river power stations, which can cause heavy turbine damage, might be replaced by a smooth reversion of the flow in a turbine according to the invention.

It is more difficult to reverse the flow with the usual strongly twisted Kaplan runner blade combined with cylindrical guide vanes, because in the transition position the radial outermost part will begin to work as a pump, while the hub portion of a vane will still work as a turbine.

According to FIG. 4 the difference of a guide vane according to the invention to a common known cylindrical guide vane consists in the feature, that not all profiles, as defined in FIG. 3 will have a straight touching line E2, which also forms the trailing edge. Those profiles being more close to meridional contour "a" in FIGS. 2 and 3 will expand downstream, passing the points E2 and being directed increasingly radially inward from contour "n" to contour "a".

Thus a potential flow according to the law $r * c_u = const$. might be realized in the space between guide vanes and runner vanes with r as the radius coordinate of a flow particle and $c_u$ as the peripheral velocity component of the local absolute velocity.

FIG. 1 is a longitudinal section of a Kaplan turbine designed according to the invention with radial inlet from the side and guide vanes LE according to the invention with axis $D_L$ located parallel to the turbine axis $D_T$. The runner LF has runner vanes LA which are able to turn around the pitch axis D as commonly known at Kaplan turbines.

FIG. 2 is a semi schematic perspective view with the essential new features of a turbine according to FIG. 1. Additional markings $N_L$, $Nm_L$, $M_L$, $MA_L$ and $A_L$ designate cross sections through the guide vane perpendicular to the axis $D_L$ and show the particular profiles according to the invention. These profiles cause a change of the direction of the exiting flow form a more tangential direction Rn near the meridian contour of the hub to a more radial direction Ra of the flow near the shroud contour a.

On this way a reduced twist of the cylinder sections N, NM, M MA and A of the runner vane LA is possible which circumstance is intended by the invention.

FIG. 3 shows a potential flow net, based on the ideal assumption of having no friction in the flow, with the proportions of FIG. 1 with steam lines STR and orthogonal potential lines POT.

This approximation of the real flow is permissible.

a) because of having accelerating flow in turbine vane cascades, b) because of the real presence of potential flow with momentum between guide vanes LE and runner vanes LA in a design according to the invention with the law $r * c_u = const$. in the space between guide vanes and runner vanes, which condition would not be possible by using cylindrical guide vanes. In FIG. 3 $\Delta Y1$ and $\Delta Y2$ designate the spacing of adjacent stream lines downstream of the guide vanes LE where there is $\Delta Y2 < \Delta Y1$, a circumstance which causes an acceleration of flow visible in the meridian section. Therefore the tendency toward flow diffusion assumable in the downstream portion of the sections $M_L$ through $A_L$ in FIG. 4, which are located normal to the guide vane axis $D_L$, is partially compensated.

Considering the flow in three-dimensions, there is the presence of a mainly accelerating flow and hence no tendency for flow separation in a guide vane cascade according to the invention even at part load conditions. A two dimensional consideration according to the two dimensional pictures of FIG. 7 (guide vane cascade in design position) and FIG. 8 (guide vane cascade in closed position) suggests diffusion near the exit portion of the channel between adjacent guide vanes.

FIG. 3 shows also the direction Z of the incoming flow and the direction A of the exiting flow, the direction Z of the incoming flow and the direction A of the exiting flow, the direction of rotation of the angular velocity ω in coincidence with the other FIGURES, the direction of view X1 for the FIG. 5, the definitions of the runner outside diameter $D_A$ and of the hub diameter $D_N$, where $D_A$ and $D_N$ are located beyond the sphere like expansion of the meridian contours n and a around the pitch axis D of the runner vanes. Further, FIG. 3 indicates the position of the cylinder sections A through N of the runner vanes and the position of the plain sections $N_L$ through $A_L$ of the guide vanes distributed over the axial width $b_a$ of the guide vanes and finally the position of the leading edges 1A and 1 and those of the trailing edges 2A and 2 of the cascades.

FIG. 4 shows the guide vane in a series of sections, spaced parallel to each other and perpendicular to the pitch-axis $D_L$, the positions in space of these sections being defined in FIG. 3 and partially also in FIG. 2. The adjustment position of the vane is drawn for the design point, compatible to the stream line picture of FIG. 3, which is also drawn for the design point.

The FIG. 4 shows a most simple reasonable application of the invention. For example the whole inlet portion of the vane with the direction SR of the flow is of cylindrical shape with permissible good approximation of the theoretical twist requirements (approximately plus/minus 5°). "Closing lines" are the touching lines of adjacent vanes in the closing position according to FIG. 8. FIG. 4 shows within the range $\Delta S_N$ of the same profile section for example in the section $M_L$ equivalent profile tangents of the twist of adjacent profiles in closing position passing the lines E1 and E2 the position of these tangents being defined in relation to radial reference lines passing also E1 and E2. The function of E1 and E2 as straight closing line one can see in FIG. 8 in the closing position, where there are E1 and E2 are seen to be located on the same radius for kinematic reasons.

The flow intercepting part of the guide vane according to the invention must not be necessarily of cylindrical shape, as the FIGURES of the patent indicate and E1 and E2 need not be cylinder generating straight lines in the application of the invention. According to FIG. 9 and FIG. 10 the flow intercepting part of the vane might have also a twist.

$\Delta S_N$ can be defined as a fraction of the hub profile chord line $S_N$ and this chord line is defined as the straight line connection of the center point of the nose radius to the middle of the trailing edge.

The FIG. 4 shows also a design application of the invention, where the whole suction side S forms essentially a cylinder ZY with a slight deviation from the clean cylinder definition near the trailing edges in the range of sections $MMA_L$ through $A_L$ in the range of $\Delta S_{MA}$, where $\Delta S_{MA}$ is the 4.5% fraction of the corresponding profile chord line $S_{MA}$.

FIG. 4 represents hence a compromise between the requirement for a twisted guide vane design according to the laws of the potential flow theory and a guide vane which has at least in the close vicinity of the straight closing lines E1 and E2 a cylindrical shape.

According to this compromise, the entrance angle $\alpha E$ is defined in relation to a radial line through pitch axis $D_L$ and is constant over the range $b_a$, whereas the exit angle $\alpha_A$ is defined as the angle between tangent to the camber line of the profile and a radial reference line R is decreasing from the hub contour n towards the outer shroud contour a. The contours n and a are defined in FIG. 3. Thus, the downstream located runner receives at outer radii a more steeply inclined and more axially directed screw like flow, whereas the flow near the hub of the runner will be directed less axially.

FIG. 5 is a top view along direction X1 towards the runner vanes. The direction of X1 was defined in FIG. 3. FIG. 5 defines the cylinder sections N, NM, M, MA, and A concentric to axis $D_T$ and limited radially by spheres $D_{kugel}$ A and $D_{kugel}$ B.

FIG. 6 shows Profile section N, NM, M, MA and A of a runner vane the locations of the sections being defined in FIG. 3. FIG. 6 shows typically for the invention the small difference of profile adjustment angles between $\beta_N$ and $\beta_A$ of only 10° in the indicated design example. As mentioned already under the description of the novelty, the consequent small twist already in the design point causes less failure of noncompatible twist at part load and overload, so that there are better efficiencies to expect, when there is a deviation from the operational design point.

FIG. 7 shows several guide vanes in the position of the design point, seen along direction X1, defined in FIG. 3, represented by parallel sections being also defined in FIG. 3.

One recognizes there the closing line E1 located upstream from the pitch axis $D_L$ and the closing line E2 located downstream of the pitch axis $D_L$ both parallel to $D_L$ in coincidence with the state of the art.

The difference from the state of the art is the extension of the profiles in a direction downstream of E2 the extension being increasing from wall contour n to wall contour a (the features a and n are defined in FIG. 3), thus enabling from n towards a an increasingly more radial direction of the exit, approaching a radial reference line through $D_L$.

FIG. 8 shows the same guide vanes in closed position and the function of the closing lines E1 and E2 parallel to $D_L$. The necessity for a cylindrical shape exists only in the close range around E1 and E2 and must not be realized in the whole entrance part upstream up from $D_L$, as the FIGURES show. FIGS. 1 through 8 show just one application of the invention.

One is able to recognize, that E1 and E2 are located on the same radius around $D_T$ in the closed position and that the tangents to the profiles passing the points E1 and E2 must have the same angle with respect to a radial reference line connecting $D_T$ with E1 and with E2.

FIG. 9 and FIG. 10 are views of the same guide vane, the views being compatible with each other and therefore no separate description of these two FIGURES is possible. The view from the front is FIG. 9 and the view from the top is FIG. 10. The FIGS. 9 and 10 show a twisted guide vane without compromise concerning the twist, having the pitch axis $D_L$ located parallel to the turbine axis $D_T$ and where the required flow angles correspond to a Kaplan turbine design according to FIG. 1.

This requirement to the flow angles consists on the one hand in the condition, that within one typical profile the trailing edge tangent to the camber line approaches more a radial reference line than the corresponding leading edge tangent to the camber line does, expressed by the angles $\alpha_{IA}$ and $\alpha_{EA}$ and on the other hand, that the exit angle of section $N_L$ when changing into the exit angle of section $A_L$, more and more approaches a radial line, so that in FIG. 10 $\alpha_{EA} < \alpha_{EN}$. The number of sections might be supplemented according to FIG. 3.

The front view of the guide vane, FIG. 9, defines three typical profile planes $A_L$, $M_L$ and $N_L$ perpendicular to $D_L$ and in the view from top one can see the three typical profile sections $A_L$, $M_L$ and $N_L$ drawn with solid lines in the closed position of the guide vanes and drawn in broken lines on the right side one can see an adjacent duplicate vane, having all three profiles offset for the same angle $\alpha t$.

The front view FIG. 9 represents a view in the direction X2, as defined in FIG. 10, the view from top in FIG. 10 represents the view in the direction X1, defined in FIG. 9.

The closing line E1 and the duplicate E2, which is offset against E1 in all sections for the same circular pitch angle $\alpha_t$ are curved lines in space as one can recognize from the front view and from the top view.

For kinematic reasons, the profile tangents t in the points E1A, E1M and E1N of the line E1 will have the same angles $\alpha_A$, $\alpha_M$ and $\alpha_N$ referring to a radial reference line as the corresponding tangents passing through the points E2A, E2M, and E2N of the duplicate closing line E2 have.

The realization of a free twist selection of the leading edge portion of the guide vane and also the realization of a free twist section on the trailing edge portion of the guide, vane both independent from each other, also has disadvantages.

The overlapping portion of the guide vanes in the closed position is small, that means a large number of guide vanes is necessary and there is a large range of high flow velocity between the vanes.

The more increasingly steep inclined profiles from section $N_L$ towards section $A_L$ must become increasingly thick to bridge the angle $\alpha_t$ thereby causing an increase of the flow velocity between the guide vanes.

In order to avoid too fat profiles $A_L$ in section A compared with profile $N_L$ in section N, the concentric circular pitch radii $r_N$, $r_N$ and rA which pass through the point couples E1A-E2A, E1M-E2M and where E1N-E2N are being a part of lines E1 and E2 must have proportions in a manner, that $r_A$ is the most small radius and $r_A$ is the most large radius. A small radius $r_A$ means a small circular pitch at the same circular pitch angle $\alpha_t$, hence less offset of E2A against E1A and hence a less fat profile $A_L$ at section A. But the profile thicknesses is still unfavorably voluminous. The extension of the vane in space is strongly inclined to the vane pitch axis $D_L$.

Considering all these complex consequences when performing a twist which is theoretically necessary without compromises, one will appreciate the simplification compromise according to FIG. 4.

Therefore appears the approximation of the twist according to FIGS. 3, 4, 7 and 8 is deemed to be the best compromise towards a creation of the condition for the presence of a potential flow between guide vanes and runner vanes.

I claim:

1. A Kaplan-turbine guide vane having a leading side and a trailing side with respect to liquid flow therepast and a vane longitudinal axis at an intermediate location between said leading and trailing sides and about which said vane is rotatable, said vane widening from a leading edge at said leading side toward said intermediate location and narrowing from said intermediate location toward a trailing edge of the vane, said vane being positioned in an array of such vanes centered on a turbine axis such that, upon rotation of the vanes of said array about the respective longitudinal axes into a closed position, each of said vanes contacts adjacent vanes at a first touching line (E1) on said leading side and a second touching line (E2) on said trailing side of the respective vane, said touching lines of each vane extending generally in the same direction as the respective longitudinal axis and said first touching line lying along an inside surface of each vane and the second touching line lying along an outside surface of each vane relative to said turbine axis, each of said vanes having a twist of the respective trailing side over at least a third of the length of the respective vane with the respective trailing side along the twist being turned progressively inwardly toward said turbine axis with a progressive increase in a distance between said second touching line and the trailing edge of the respective vane.

2. The Kaplan-turbine guide vane defined in claim 1 wherein successive sections of said vane along said twister have trailing sides progressively changing from a tangential direction to a radial direction along said twist.

3. The Kaplan-turbine guide vane defined in claim 1 wherein said vane has a cylindrical configuration along a convex side thereof between said first and second touching lines and said first and second touching lines are parallel to the longitudinal axis of said vane.

4. The Kaplan-turbine guide vane defined in claim 1 wherein said first and second touching lines are slightly curved.

5. The Kaplan-turbine guide vane defined in claim 1 wherein tangents to said vane intersecting said first and second touching lines have equal angles with respect to a radial reference line passing through intersections of tangents and with said first and second touching lines.

* * * * *